United States Patent
Furukawa et al.

(10) Patent No.: US 8,205,101 B2
(45) Date of Patent: Jun. 19, 2012

(54) ON-MACHINE POWER SUPPLY WITH INTEGRAL COUPLING FEATURES

(75) Inventors: James Furukawa, Vernon Hills, IL (US); Nicholas R. Goebel, Oak Creek, WI (US); Amy L. Stachowiak, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 902 days.

(21) Appl. No.: 12/236,411

(22) Filed: Sep. 23, 2008

(65) Prior Publication Data

US 2009/0265566 A1    Oct. 22, 2009

Related U.S. Application Data

(60) Provisional application No. 61/046,250, filed on Apr. 18, 2008.

(51) Int. Cl.
  *G06F 11/00* (2006.01)
  *G06F 9/00* (2006.01)
  *G06F 1/00* (2006.01)
  *G06F 11/30* (2006.01)
  *H03L 7/00* (2006.01)
  *H03L 5/00* (2006.01)
  *G05F 1/00* (2006.01)
  *H01H 3/00* (2006.01)

(52) U.S. Cl. .......... 713/300; 714/25; 713/340; 713/310; 713/1; 327/143; 327/310; 327/142; 323/266; 323/282; 307/142

(58) Field of Classification Search ............ 714/25; 327/143, 310, 142; 323/266, 282; 307/142; 713/340, 310, 1
See application file for complete search history.

(56) References Cited

U.S. PATENT DOCUMENTS

| | | | |
|---|---|---|---|
| 5,181,026 A | 1/1993 | Granville | |
| 2002/0047639 A1 | 4/2002 | Okuchi et al. | |
| 2004/0217785 A1* | 11/2004 | Colbeck et al. | 327/142 |
| 2005/0116546 A1* | 6/2005 | Zeighami et al. | 307/51 |
| 2005/0125709 A1* | 6/2005 | McKim et al. | 714/25 |
| 2006/0033547 A1* | 2/2006 | Chou | 327/310 |
| 2006/0145833 A1 | 7/2006 | Brandt et al. | |
| 2007/0008749 A1 | 1/2007 | Baurle et al. | |
| 2007/0046004 A1 | 3/2007 | Komaki et al. | |
| 2007/0070558 A1 | 3/2007 | Liu | |
| 2007/0080726 A1* | 4/2007 | Khan et al. | 327/143 |
| 2008/0191675 A1* | 8/2008 | Besser et al. | 323/282 |
| 2008/0284389 A1* | 11/2008 | Kawase et al. | 323/266 |
| 2009/0265571 A1 | 10/2009 | Furukawa et al. | |

* cited by examiner

*Primary Examiner* — Thomas Lee
*Assistant Examiner* — Aurel Prifti
(74) *Attorney, Agent, or Firm* — Fletcher Yoder, P.C.

(57) ABSTRACT

A power supply for providing power to devices in a network is described as incorporating an integral coupling feature that terminates the provision of power from an upstream power supply while maintaining connectivity of communications signals and ground from an upstream portion to a downstream portion of the network relative to the power supply. The power supply includes a logic feature that monitors a power status of an upstream power supply and/or its own power status. When the logic feature detects a power cycle, it initiates a coordinated power cycle of the associated power supply and/or other networked power supplies.

9 Claims, 5 Drawing Sheets

ON-MACHINE POWER SUPPLY WITH INTEGRAL COUPLING FEATURES

CROSS REFERENCE TO RELATED APPLICATIONS

This application is a Nonprovisional Patent Application of Provisional Patent Application No. 61/046,250, entitled "On-Machine Power Supply with Integral Coupling Features", filed Apr. 18, 2008, which is herein incorporated by reference.

BACKGROUND

The present invention relates generally to control and monitoring networks, such as those used in industrial applications. More particularly, the invention is directed to techniques associated with communication between multiple networked power supplies in a control and monitoring system.

A control and monitoring system may include a device or set of devices that monitor and/or manage the behavior of other devices of a system. Indeed, a control and monitoring system may essentially act as a nerve center for a system. For example, in many industrial and commercial applications, a device, such as a programmable controller or computer, may send and receive signals over a network to operate and/or monitor a wide range of motors, valves, actuators, sensors, and the like. It should be noted that a control system may include one or more individual controllers, computers, and so forth, in a single location or remote locations. In other words, the control system may be centrally located or distributed throughout the system. Indeed, the control system may be integrated into various networked components that collectively define the control system.

A control and monitoring system typically utilizes a network to facilitate communication between various industrial devices, such as sensors and actuators, and higher-level devices, such as programmable controllers and computers. A range of networks and corresponding protocols are known and are presently available to facilitate control and monitoring operations. For example, DeviceNet, which is based on controller area network (CAN) technology, is an open device level network developed by Rockwell Automation that uses common industrial protocol (CIP) to provide the capability to control, configure, and collect data for many available industrial devices.

Control system networks include certain physical components or features that facilitate proper operation and communication. For example, a control system network may include various conductors to facilitate transmission of power and data signals between components of the network. In other words, various devices of a control system may be communicatively coupled to one another via such conductors. A typical data system, such as for the DeviceNet protocol, includes a ground conductor, a power conductor, and a pair of data conductors. In some systems, each of these conductors may be provided as a single cable. For example, the various conductors may be provided within a single sheath that defines the outer portion of a cable, or the various conductors may be sheathed separately and bundled together as a single cable to efficiently provide each of their various functions throughout a system.

The power conductor in a control system network supplies various devices of the control system network with power from a power supply. The power supply may receive power originating from a power source, such as a power grid, at an initial power level and convert the power to an operable power level. For example, a particular power supply may receive power from a 110 VAC source, convert the 110 VAC to 24 VDC, and supply a plurality of devices with the 24 VDC to facilitate operation of each of the devices. However, a single power supply may be limited in its ability to provide sufficient power under certain circumstances. Indeed, due to voltage losses, a single power supply may not be able to provide power over long distances. For example, if several devices are substantially spaced apart on a power conductor, the power supply may not be able to efficiently power both devices because of voltage losses over the length of the power conductor. Similarly, a single power supply may not be capable of powering a large number of devices. Accordingly, it is often desirable to utilize multiple power supplies in a single network to provide sufficient power while maintaining communication between the networked devices.

While the inclusion of multiple power supplies may facilitate the operation of systems including numerous devices and/or systems including long cable lengths, it is now recognized that inclusion of multiple power supplies may cause difficulties in responding to functional issues that would benefit from uniform operation of the power supplies.

BRIEF DESCRIPTION

Embodiments of the present technique facilitate inclusion of multiple power supplies on a control and monitoring system network, and communication between the multiple power supplies. More particularly, present embodiments are directed to a power supply configured to monitor itself and/or an upstream power supply to detect a power cycle and initiate a coordinated power cycle. In accordance with certain embodiments, this is achieved by including an integral coupling feature and a logic circuit in each of a plurality of power supplies. The coupling feature may include a "T-connector" that is configured to couple with a power source, an upstream portion of a network cable, and a downstream portion of the network cable. Further, the coupling feature is configured to break into a network, terminate power from an upstream power conductor, and communicatively couple a localized power supply with a downstream power conductor, while maintaining connectivity of data communication and ground between the upstream and downstream portions of the network cable. The logic circuit operates such that it monitors whether a power cycle has occurred and then initiates a corresponding power cycle. For example, the logic circuit may monitor a power level from an upstream conductor to determine whether a power cycle has occurred in an upstream power supply, and initiate a power cycle of the localized power supply associated with the logic circuit upon detection of a confirmed power cycle in the upstream power supply.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
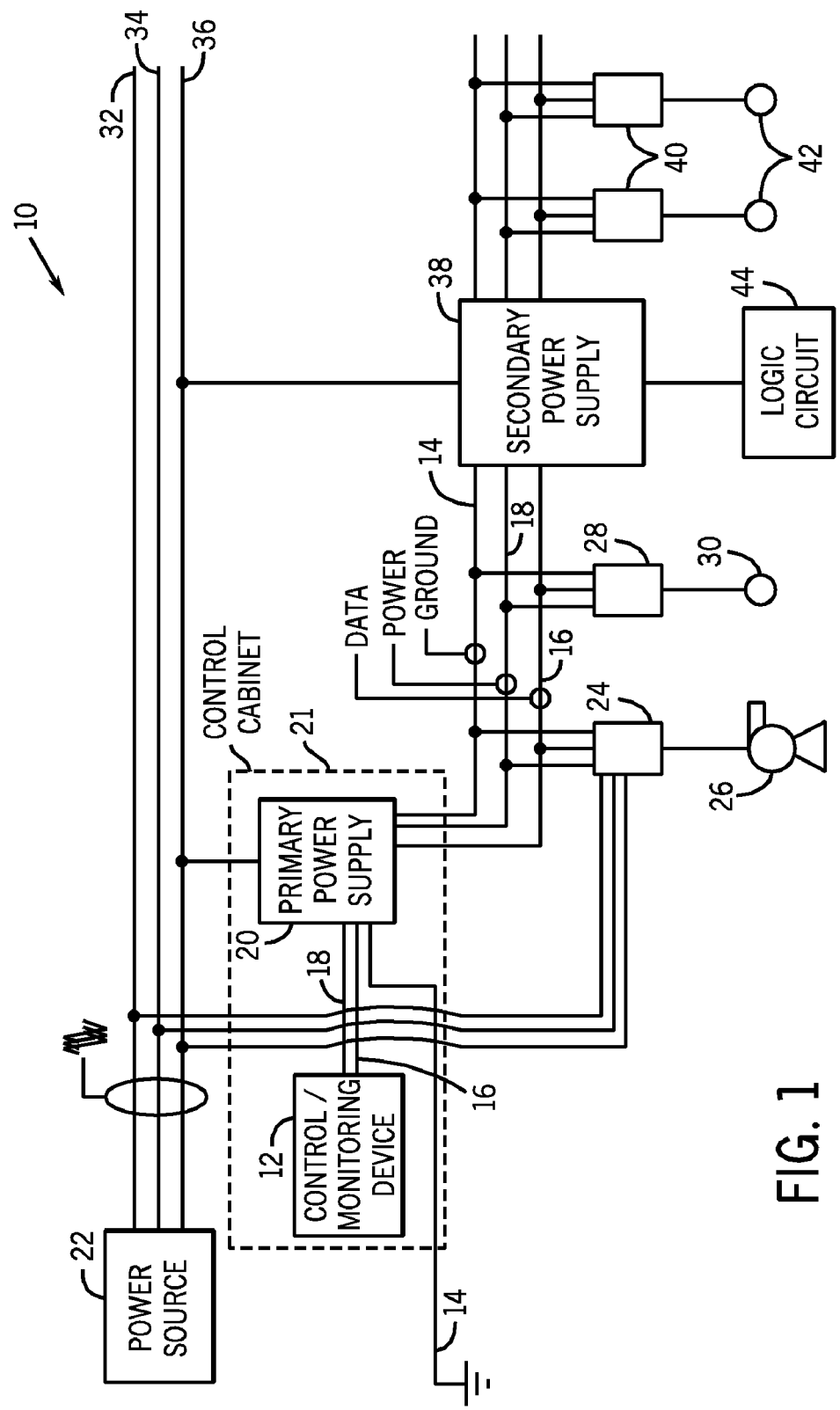
FIG. 1 is diagrammatical representation of a control and monitoring system incorporating coordinated power supplies in accordance with aspects of the present technique.

Turning now to the drawings, and referring first to FIG. 1, a control and monitoring system is illustrated and designated generally by reference numeral 10. The system 10 may be incorporated into any of a variety of industrial settings, which might include manufacturing processes, assembly lines, material handling and conveyers, chemical process controls, fluid handling systems, and so forth. The present techniques are not intended to be limited to any particular types of monitored or controlled processes.

As illustrated, the system 10 includes various components for supplying electrical power and signals to sensors, controllers, mechanical equipment, and the like that are communicatively coupled with and incorporated into the system 10. As will be appreciated by those skilled in the art, components operated or monitored by the system 10 may include any of a wide range of features that have powered loads and/or points at which certain sensed data is collected for control and monitoring purposes. For example, in the illustrated embodiment, the system 10 comprises a control and monitoring device 12 that communicates with various sensors, controllers, and equipment of the system 10. Communications between the control and monitoring device 12 and other system components may be transmitted via a cable that includes a ground conductor 14, a pair of data conductors 16, and a power conductor 18. Thus, both data and power may be transmitted throughout the system over a single network.

The control and monitoring device 12 may include, for example, a programmable controller, a computer, or the like. The control and monitoring device 12 may function as a receiving and processing center for any number of data signals. Additionally, the control and monitoring device 12 may generate response signals or control signals for various components of the system 10. In other words, the control and monitoring device 12 may operate as a nerve center for the system 10. However, it should be noted that while FIG. 1 illustrates the control and monitoring device 12 as a centralized feature, in other embodiments control and monitoring functionality may be distributed throughout the system 10. Indeed, various components of the system 10 may coordinate their individual functions to collectively provide control and monitoring functionality for the entire system 10.

In some embodiments, the control and monitoring device 12 may have a dedicated power supply that may be integral with the control and monitoring device 12. However, in the illustrated embodiment, the control and monitoring device 12 is powered by a primary power supply 20, which also powers other system components. Further, in the illustrated embodiment, both the control and monitoring device 12 and the primary power supply 20 are located in a control cabinet 21 that is centrally located in the industrial setting of the system 10 to facilitate user access. Accordingly, in the event that it is desirable to make direct adjustments to the control and monitoring device 12 or the primary power supply 20, a user may readily access the control cabinet 21 to make such physical adjustments.

In operation, the primary power supply 20 may convert power received at a first level from a power source 22, such as a power grid, to an operable power level suitable for use in powering the control and monitoring device 12 or other features of the system 10, such as a motor controller 24 that controls, for example a pump 26, or a sensor 28 that cooperates with a sensing element 30. For example, the power source 22 may provide three-phase power that is conducted over three separate source lines 32, 34, and 36. The primary power supply 20 may communicatively couple with one of the source lines 32, 34, or 36 to receive a single phase of 110 VAC power. Further, the primary power supply 20 may convert the 110 VAC to an operable voltage, such as 24 VDC, to provide an appropriate level of power to system devices. For example, in the illustrated embodiment, the primary power supply 20 converts power from source line 36 to provide operable power to the control and monitoring device 12, the motor controller 24, and the sensor 28. Specifically, the primary power supply 20 supplies the operable power to the various devices via the power conductor 18.

While the primary power supply 20 may be capable of providing operable power to a number of devices that are spaced over a certain distance, its abilities are limited. Indeed, due to voltage losses and power demands, a single power supply, such as the primary power supply 20, may not be able to supply power to devices that are separated by long lengths of cable. Similarly, the primary power supply 20 may not be capable of supplying a large number of devices with an appropriate level of power. Accordingly, depending on the size and nature of a particular system, it may be necessary to provide additional power supplies. For example, in the illustrated embodiment, a secondary power supply 38 is incorporated into the system 10. Specifically, the secondary power supply 38 is positioned downstream of the primary power supply 20 and provides power for various downstream devices, such as a pair of sensors 40 that cooperate with a pair of sensing elements 42. This may be achieved, in part, by integrating a coupling feature, such as a "T-connector," into the secondary power supply 38 that facilitates connectivity between certain portions of the network upstream and downstream of the secondary power supply 38, and receipt of power from a source, such as power source 22.

The integral coupling features of the secondary power supply 38 may reduce inefficiencies associated with coupling traditional power supplies to a network. Traditional power supplies are typically coupled to a network via a drop cable and a coupling device, such as a T-connector. The drop cable may couple with the power supply and the T-connector, and the T-connector may couple with drop cable and the network cable. The T-connector may break into the network cable, terminate power supplied from the network cable upstream of the T-connector, and facilitate the provision of power to components on the network cable downstream of the T-connector from the secondary power supply. This traditional technique for providing supplemental power requires numerous components that can be expensive and inconvenient to install. In contrast, integral coupling features of power supplies in accordance with present embodiments perform such functions.

In the illustrated embodiment, the secondary power supply 38 receives power directly from the power source 22 via source line 36. In other embodiments, a power source other than that supplying the primary power supply 20 may provide power to the secondary power supply 38. Regardless, the secondary power supply 38 converts power from a power source, such as the power source 22, to a usable power level for devices that rely on the power supply 38 for power, such as the pair of sensors 40 positioned downstream from the secondary power supply 38 on the network cable.

In addition to coupling with the source line 36, the secondary power supply 38 also communicatively couples with the network cable, which includes the ground conductor 14, the pair of data conductors 16, and the power conductor 18. Not only does the network cable provide a conduit for power transmission, it also facilitates flow through of network communication and grounding. Accordingly, the secondary power supply 38 is configured to facilitate connectivity of the ground conductor 14 and the pair of data conductors 16 in the portion of the network cable upstream of the secondary power supply 38 with the same components of the portion of the network cable downstream of the secondary power supply 38. Accordingly, all of the devices of the system 10 may communicate and maintain connectivity to ground via a single network. However, the secondary power supply 38 is configured to terminate the upstream power conductor 18, and take over supplying the power requirements downstream of the secondary power supply 38. Further, the secondary power supply 38 includes a logic circuit 44 configured to monitor power cycles of one or both of the primary power supply 20 and the secondary power supply 38, and initiate a corresponding power cycle upon identifying a reset, as will be discussed in further detail below.

Figure 2:
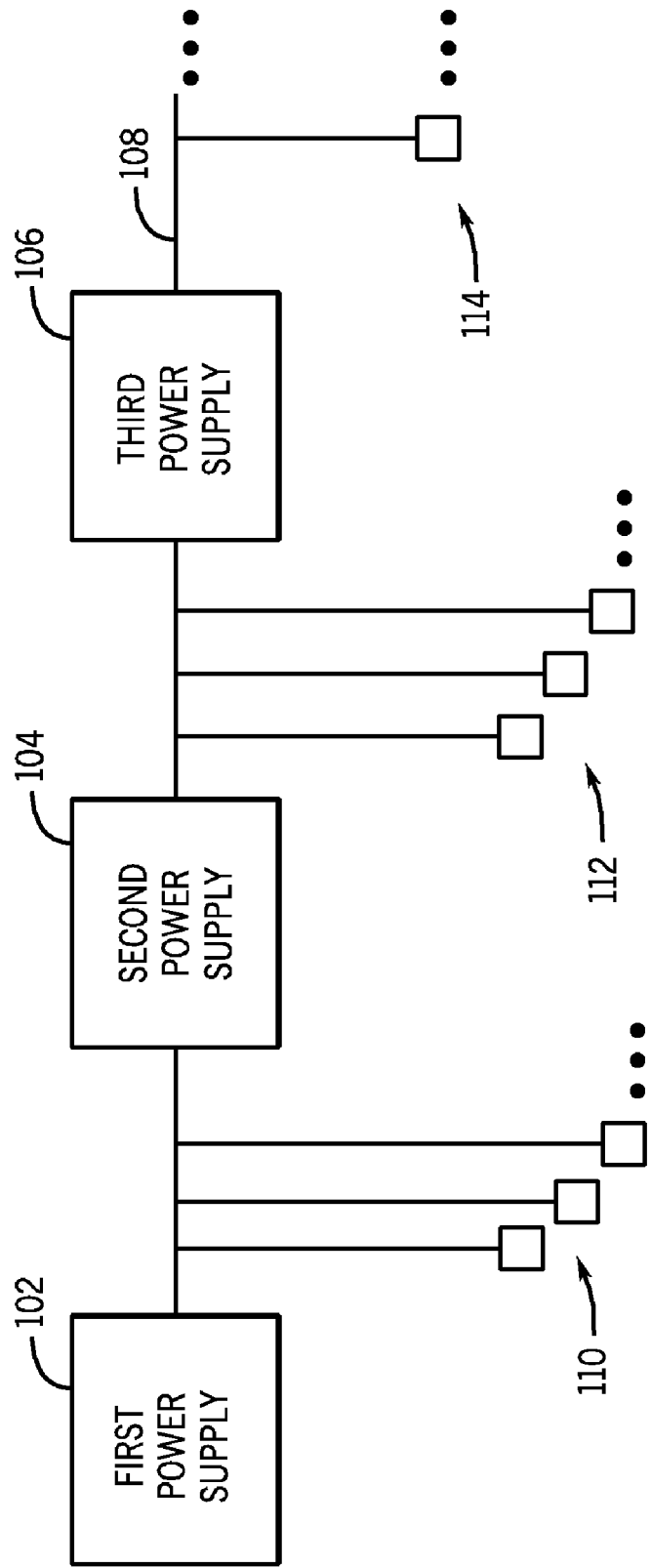
FIG. 2 is diagrammatical representation of a plurality of power supplies communicatively coupled along a network in accordance with aspects of the present technique.

While the system illustrated in FIG. 1 only includes two power supplies, the primary power supply 20 and the secondary power supply 38, in other embodiments any number of power supplies may be employed. For example, FIG. 2 is a schematic representation of multiple power supplies, as represented by a first power supply 102, a second power supply 104, and a third power supply 106, which are communicatively coupled together serially along a network cable 108. Each of the power supplies 102, 104, and 106 may be required to power a respective set of devices disposed along the network cable. For example, each power supply 102, 104, and 106 may provide power to a set of devices positioned downstream relative to each power supply. Such devices are represented by device sets 110, 112, and 114.

Due to inefficiencies associated with cable lengths between the devices or the number of devices, a single power supply may not be capable of efficiently powering all of the device sets 110, 112, and 114. Accordingly, in the illustrated embodiment, the first power supply 102 supports the device set 110 directly downstream from the first power supply 102, the second power supply 104 supports the device set 112 directly down stream from the second power supply 104, and so forth. While the second power supply 104 is communicatively coupled to the same network cable 108 as the first power supply 102, as discussed above, the second power supply 104 terminates the power conductor of the network cable, thus terminating the supply of power from the first power supply 102. Further the secondary power supply 104 takes over the power requirements of the device set 112, which is directly downstream from the second power supply 104. Similarly, the third power supply 106 terminates power supplied from the secondary power supply 104, and provides power to the device set 114 downstream from the third power supply 106. Additional power supplies and device sets may be incorporated accordingly.

Including a plurality of traditional power supplies in a single system may create efficiency issues associated with responding to certain functional issues of a particular system. For example, it may be desirable to reset all of the devices on a particular system, such as all of the device sets 110, 112, and 114. More specifically, for example, devices on certain networks, such as DeviceNet, may go into a "dead state" or "sleep state" in reaction to network communications faults or errors. After the occurrence of such a fault, the devices along the network may remain powered, but cease network communications. In order for the devices to recover, it may be necessary to reset each device. In other words, to make the devices operable again, it may be necessary to re-initiate each device. The most efficient way to reset the devices may be to cycle power to the devices. For example, a device may be reset by turning off power to the device from its power supply for an amount of time and then reinitiating the supply of power to the device (i.e., power cycling). However, because many systems include numerous traditional power supplies, it can be very time consuming and difficult to reset every device in the system. Indeed, in existing networks, it may be necessary for an operator to manually reset every power supply in a facility by power cycling or disconnecting an output from each power supply and reconnecting it. In many situations, the power supplies are not easily accessible and require a significant amount of time and effort to power cycle. Indeed, it is common for one or more power supplies to be located on equipment that is suspended high above a factory floor or in a remote location.

Accordingly, power supplies in accordance with present embodiments are configured to sense when power has been removed for re-initialization of one power supply and initiate a corresponding re-initialization such that all of the power supplies on a network correspondingly reset when one of the power supplies resets. In other words, one power supply reset may be cascaded to all of the power supplies on a network. A reset of a power supply may refer to a cycle of providing power and not providing power. For example, in one embodiment, a downstream power supply detects that an upstream power supply has been reset by detecting that the upstream power supply is not providing power and then detecting that the upstream power supply has resumed providing power. Further, the downstream power supply may essentially mimic the upstream power supply. For example, upon detecting that the upstream power supply is not providing output power, the downstream power supply may stop providing output power. Similarly, upon detecting that the upstream power supply has resumed providing output power, the downstream power supply may resume providing output power. Thus, the reset of a single power supply may be cascaded to all of the power supplies on a network.

Figure 3:
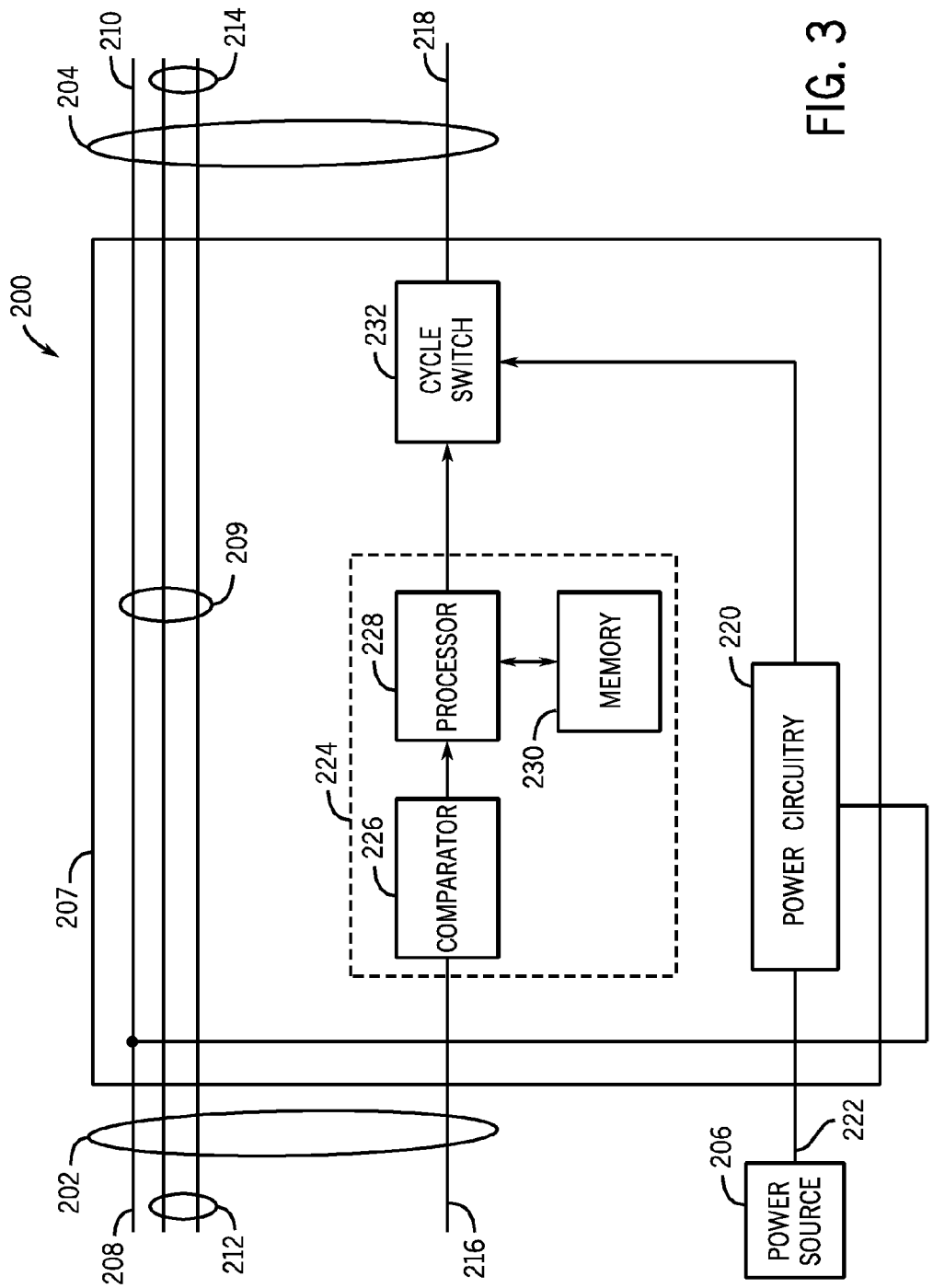
FIG. 3 is a diagrammatical representation of a power supply coupled to an upstream network cable, a downstream network cable, and a power source in accordance with aspects of the present technique.

FIG. 3 is a schematic of a power supply 200 in accordance with present embodiments that is coupled to an upstream network cable 202, a downstream network cable 204, and a power source 206. The power supply 200 may include various components disposed in a single protective shell or housing 207, wherein the housing 207 is configured for on-machine functionality. For example, the housing 207 may include environmentally hardened components that have an ingress protection number of IP67 to withstand exposure to moisture, dust, and other elements that may be found in an industrial or commercial setting.

The components disposed in the housing 207 coordinate with each other, the upstream network cable 202, and the downstream network cable 204. Indeed, the power supply 200 includes integral coupling features that facilitate communicative coupling between the upstream and downstream network cables 202 and 204. For example, in the illustrated embodiment, conductive elements 209 of the power supply 200 function to maintain connectivity of communication signals and ground between the upstream network cable 202 and the downstream network cable 204 by communicatively coupling a first ground conductor 208 of the upstream network cable 202 to a second ground conductor 210 of the downstream network cable 204, and communicatively coupling a first data conductor pair 212 of the upstream network cable 202 to a second data conductor pair 214 of the downstream network cable 204. However, integral coupling features of the power supply 200 terminate the incoming power from a first power conductor 216 of the upstream network cable 202 and provide power to a second power conductor 218 of the downstream network cable 204 from local power circuitry 220. The power circuitry 220 may transform power received from a source cable or conductor 222 at a first voltage level, such as 110 VAC, to a usable voltage level, such as 24 VDC, that is then selectively transmitted to the second power conductor 218. It should be noted that coupling of the conductors of the upstream and downstream network cables 202 and 204 to features of the power supply 200, such as the conductive elements 209, may be achieved via terminals or the like disposed within the housing 207.

While the power supply 200 may terminate the incoming power from the first power conductor 216, voltage supplied by the first power conductor 216 may still be utilized by a logic feature 224 of the power supply 200, which may not be included in some power supplies in accordance with present embodiments. The logic feature 224 may include a comparator module 226, a processor 228, and a memory 230. While the illustrated embodiment depicts a digital embodiment with a processor, it should be noted that other embodiments may include analog circuitry. Each of the components of the logic feature 224 may cooperate to activate or deactivate certain features of the power supply 200 in accordance with present embodiments. For example, in the illustrated embodiment, the first power conductor 216 is communicatively coupled with the comparator module 226. In operation, the comparator module 226 detects a voltage level of power provided via the first power conductor 216. Further, in coordination with the processor 228 and the memory 230, the comparator module 226 compares the measured voltage level to a threshold value. Thus, the logic feature 224 functions as a monitor of a power status of an upstream power supply. For example, the threshold value may be 11 V, and when the measured voltage level falls below 11 V for a set amount of time, such as 100 milliseconds, the logic feature 224 may determine that an upstream power supply has been reset. Further, the logic feature 224 may initiate a reset of the power supply 200. For example, if the measured voltage level falls below the threshold value for a designated amount of time, a cycle switch 232 may be toggled or activated. The cycle switch 232 may be configured to reset the power circuitry 220 or prevent power from being supplied to devices downstream from the power supply 200. In other words, the cycle switch 232 may prevent power transmission to the second power conductor 218. It should be noted that while the cycle switch 232 is illustrated downstream from the power circuitry 220, in some embodiments, the cycle switch 232 may be positioned prior to or within the power circuitry 220.

Figure 4:
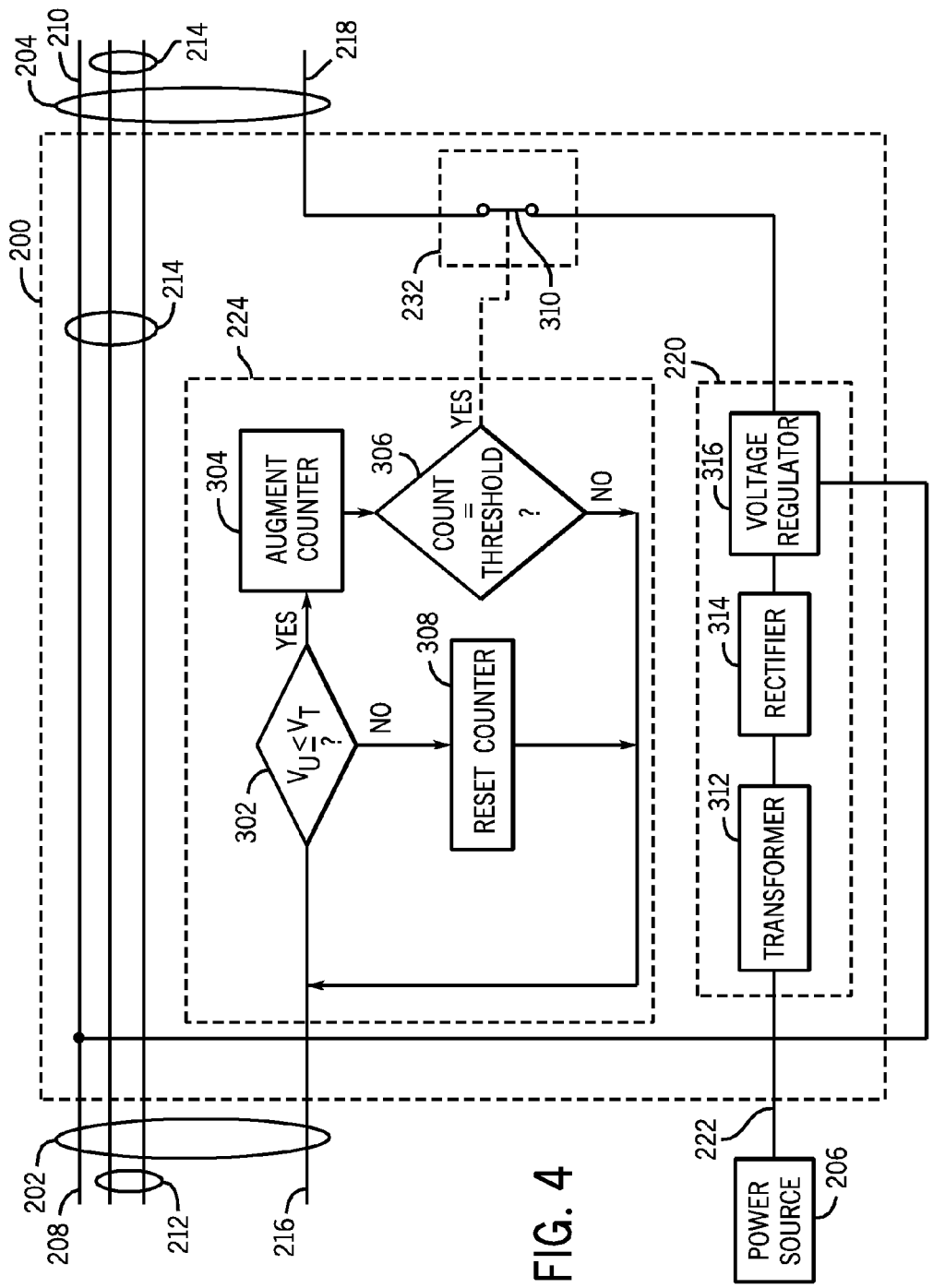
FIG. 4 is a schematic representation of the functionality of the power supply illustrated in FIG. 3 in accordance with aspects of the present technique.

FIG. 4 is a schematic representation of the power supply 200 illustrated in FIG. 3 and its functionality. As in FIG. 3, the conductive elements 209 of the power supply 200 are illustrated as functioning to maintain connectivity of communication signals and ground between the upstream network cable 202 and the downstream network cable 204 by communicatively coupling the first ground conductor 208 to the second ground conductor 210, and communicatively coupling the first data conductor pair 212 to the second data conductor pair 214. The incoming power from the first power conductor 216 is illustrated as being terminated by the logic feature 224, and power is illustrated as being selectively supplied to the second power conductor 218 by the power circuitry 220.

Specifically, with regard to the functionality of the logic feature 224, power from the first power conductor 216 is illustrated as being received into a comparison function 302. The comparison function 302 represents measuring an upstream voltage level ($V_U$) received from the first power conductor 216 and comparing the measured upstream voltage level to a voltage threshold ($V_T$). The threshold value may be preprogrammed into the power supply 200 during manufacture or set by a user. For example, because a typical voltage requirement for proper device operation may be 20-24 VDC, the voltage threshold value may be set at 11 V by configuring a memory or analog component of the logic feature 224 (e.g., a reference voltage input to a comparator). Thus, when the measured upstream voltage level falls below the voltage threshold, it may be interpreted by the logic feature 224 as indicating that the associated devices were not functional and that the upstream power supply has experienced a power cycle or a reset. However, a dip in voltage may not always correspond to a power cycle or a reset. Indeed, a minor dip in a measured voltage level may correspond to a brief measurement error or some other brief system issue. Accordingly, in the illustrated embodiment, the logic feature 224 includes components that facilitate confirmation that a reduced power state lasts long enough to be properly identified as a power cycle. For example, this functionality is represented by a counter augmentation function 304, a count comparison function 306, and a count reset function 308.

In operation, when a voltage value below a threshold is detected by the comparison function 302, a counter may be augmented, as illustrated by the counter augmentation function 304. It should be noted that the counter could have been represented as a timer or the like. The purpose of the illustration is to demonstrate that, in some embodiments, reduced power does not qualify as a detected upstream reset unless it lasts for a designated amount of time, such as 100 or 200 milliseconds. The counter may continue to be augmented by the augmentation function 304 until the measured voltage is greater than the threshold. Thus, if the measured voltage remains below the threshold for long enough, the counter will equal a counter threshold, as determined by the count comparison function 306. If the counter equals the counter threshold, a switch function 310, which is represented by a "normally closed" switch, may be activated to cycle power to the second power conductor 218 from the power circuitry 220. If the measured voltage does not remain below the threshold for long enough to activate or toggle the switch function 310, the counter may be reset, as indicated by the reset function 308 (i.e., riding through the temporary voltage drop upstream). It should be noted that the components of the logic feature 224 illustrated in FIG. 4 are representative of functionality and may be implemented in various ways, as would be understood by one of ordinary skill in the art.

As indicated above, the power circuitry 220 receives power from the source conductor 222 and converts the received power to a usable power level, such as 24 VDC. Specifically, the power circuitry 220 may include a transformer 312, a rectifier 314, and a voltage regulator 316. The transformer 312, rectifier 314, and voltage regulator 316 cooperate to receive the power from the source conductor 222, reduce the voltage, convert the alternating current to direct current, and maintain a substantially constant voltage level. For example, as indicated above, the power circuitry 220 may receive 110 VAC and convert it to 24 VDC or another voltage that may be utilized by devices downstream from the power supply 200. It should be noted that certain functions of the power circuitry 220 may be deactivated by the logic feature 224 if an upstream power cycle is detected to cycle the power provided to the devices from the power supply 200, or access to the power from the power circuitry 220 may be prevented with a switch or the like.

Figure 5:
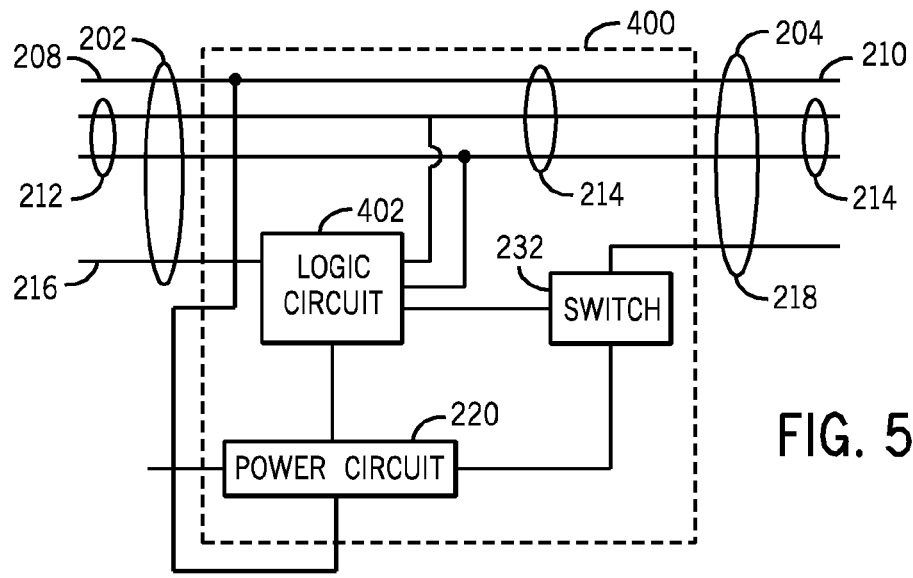
FIG. 5 is a diagrammatical representation of a power supply configured to transmit power status information via data conductors in accordance with aspects of the present technique.

FIG. 5 is a diagrammatical representation of a power supply 400 similar to the power supply 200 illustrated in FIG. 3. Indeed, as illustrated, various features of the power supply 400 are identical to those of the power supply 200, and, thus, are identified by corresponding reference numerals. However, the power supply 400 is configured to detect a power cycle or reset of an upstream power supply and/or a power cycle of the power supply 400, itself. Further, the power supply 400 may be configured to transmit power status information to other power supplies in a network via the conductive elements 209 that communicatively couple with the data conductor pairs 212 and 214.

The power supply 400 includes a logic circuit 402 that performs certain functions relating to identification and initiation of power cycles. Indeed, the logic circuit 402 illustrated in FIG. 5 may operate similarly to the logic feature 224 described with regard to FIGS. 2 and 3. However, instead of or in addition to monitoring the voltage of power received from an upstream power supply via the first power conductor 216, the logic circuit 402 may monitor whether the power supply 400 has been reset. For example, the logic circuit 402 may monitor data or power levels provided by the power circuit 220. If the logic circuit 402 identifies a power cycle from the upstream power supply and/or the power supply 400, it may communicate that such an event has occurred to other power supplies on a shared network by transmitting status data via the data conductor pairs 212 and 214 of the network cabling. In summary, the embodiment illustrated by FIG. 5 may communicate via the data conductor pairs 212 and 214 that a power supply has power cycled, and logic circuitry on other networked power supplies may cause them to power cycle as well. As would be understood by those of ordinary skill in the art, the detection and communication functions of the logic circuit 402 may be performed by a processor and a programmed memory.

Figure 6:
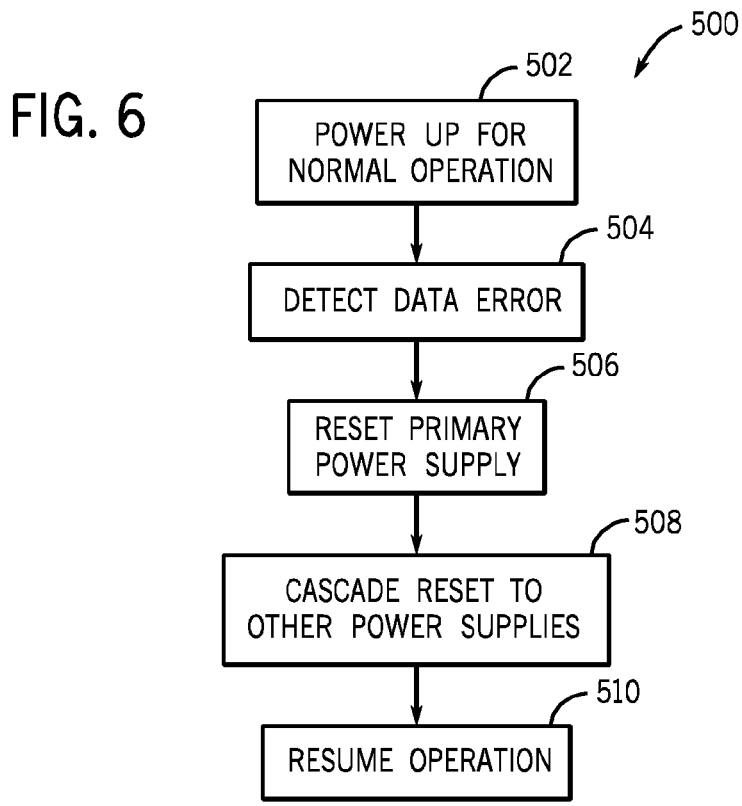
FIG. 6 is a process flow diagram representing a method in accordance with aspects of the present technique.

FIG. 6 is a process flow diagram representing a method in accordance with aspects of the present technique. The method is generally indicated by reference numeral 500. The method 500 begins with powering up a device or set of devices with a power supply for normal operation, as represented by block 502. Specifically, block 502 may represent activating numerous power supplies that provide power to various sets of devices on a network, respectively. During normal operation, one or more of the devices may detect a data error, as represented by block 504. Upon detecting such a data error or for any other reason, the devices may enter a "dead state" or "sleep state," wherein the devices remain powered, but cease to participate in network communications. In order to reestablish network communications, it may be necessary or desirable to cycle the power to the devices. In other words, it may be necessary to power down the devices and then power them up again. This may be achieved by cycling or disconnecting and reconnecting each power supply that provides power to the respective devices. However, it may be inefficient to individually cycle the power to each power supply in a network because there may be numerous power supplies and/or the power supplies may be located in inconvenient positions. Thus, in accordance with present embodiments, a coordinated power cycle may be achieved by resetting a primary power supply, as illustrated by block 506. The primary power supply may be located in a position that is readily accessible by a user. Upon resetting the primary power supply, downstream power supplies may detect the reset, such as by monitoring a voltage from the power supply directly upstream, and initiate a self-reset. Thus, the reset of the primary power supply may cascade to all downstream power supplies that are serially linked together, as illustrated by block 508. Once all of the power supplies have been reset, the corresponding devices may resume normal operation and network communications, as illustrated by block 510.

While only certain features of the invention have been illustrated and described herein, many modifications and changes will occur to those skilled in the art. It is, therefore, to be understood that the appended claims are intended to cover all such modifications and changes as fall within the true spirit of the invention. The concurrently filed application entitled "System and Method for Employing an On-Machine Power Supply with Monitoring and Control Capability" by James Furukawa, Nicholas R. Goebel, Robert D. Law, and Amy L. Stachowiak, which was assigned docket number 08AB062, is hereby incorporated by reference in its entirety. Also, the concurrently filed application entitled "Single-Input and Dual-Output Power Supply with Integral Coupling Feature" by James Furukawa, Nicholas R. Goebel, Derrick S. Hinds, and Amy L. Stachowiak, which was assigned docket number 08AB063, is hereby incorporated by reference in its entirety.

The invention claimed is:

1. A power supply, comprising:
   a transmission path configured to communicatively couple input conductors of the power supply to output conductors of the power supply to facilitate transmission of communication signals between the input and output conductors;
   an upstream power terminal configured to terminate an input power conductor such that a supply of power from a separate upstream power source via the input conductor into the upstream power terminal is blocked from passing downstream of the power supply;
   a power converter communicatively coupled to an output power conductor of the power supply, wherein the power converter is configured to receive power from a power source, convert the power, and supply the power to the output power conductor;
   a control circuit configured to cycle power supplied by the power converter to the output power conductor based on detection of a power cycle on the upstream power terminal; and
   a comparator module configured to compare a voltage or current on the upstream power terminal with a threshold value and initiate cycling power supplied by the power converter when the voltage or current on the upstream power terminal falls below the threshold value for an amount of time.

2. The power supply of claim 1, wherein the transmission path is configured to maintain connectivity of communication signals between an upstream network cable coupled with the input conductors and a downstream network cable coupled with the output conductors.

3. The power supply of claim 1, wherein the transmission path is configured to maintain connectivity of ground between an upstream network cable coupled with the input conductors and a downstream network cable coupled with the output conductors.

4. The power supply of claim 1, wherein the upstream power terminal is configured to terminate a conductive component of an upstream network cable.

5. The power supply of claim 1, wherein the threshold value is 18 V.

6. The power supply of claim 1, wherein the amount of time is 100 to 200 milliseconds.

7. The power supply of claim 1, comprising a reset feature configured to cycle power supplied by the power converter to the output power conductor when activated.

8. The power supply of claim 1, wherein the control circuit is configured to transmit status data indicating that a reset has occurred via the output conductors based on detection of a power cycle on the upstream power terminal.

9. The power supply of claim 1, comprising a housing, wherein the transmission path, upstream power terminal, power converter, and control circuit are disposed within the housing.

* * * * *